US008370142B2

(12) United States Patent
Frankel et al.

(10) Patent No.: US 8,370,142 B2
(45) Date of Patent: Feb. 5, 2013

(54) REAL-TIME TRANSCRIPTION OF CONFERENCE CALLS

(75) Inventors: David P. Frankel, Los Gatos, CA (US); Noel Tarnoff, Chicago, IL (US)

(73) Assignee: ZipDX, LLC, Los Gatos, CA (US)

( * ) Notice: Subject to any disclaimer, the term of this patent is extended or adjusted under 35 U.S.C. 154(b) by 60 days.

(21) Appl. No.: 12/914,617

(22) Filed: Oct. 28, 2010

(65) Prior Publication Data

US 2011/0112833 A1 May 12, 2011

Related U.S. Application Data

(60) Provisional application No. 61/256,558, filed on Oct. 30, 2009.

(51) Int. Cl.
*G10L 15/26* (2006.01)
*H04M 3/42* (2006.01)

(52) U.S. Cl. .................................. 704/235; 379/202.01

(58) Field of Classification Search ............. 379/202.01; 704/231–257
See application file for complete search history.

(56) References Cited

U.S. PATENT DOCUMENTS

| | | | | |
|---|---|---|---|---|
| 6,487,534 | B1* | 11/2002 | Thelen et al. | 704/270 |
| 6,747,685 | B2 | 6/2004 | Taib | |
| 6,785,653 | B1 | 8/2004 | White | |
| 6,816,468 | B1 | 11/2004 | Cruickshank | |
| 6,816,834 | B2 | 11/2004 | Jaroker | |
| 6,850,609 | B1* | 2/2005 | Schrage | 379/202.01 |
| 7,016,844 | B2* | 3/2006 | Othmer et al. | 704/270.1 |
| 7,130,404 | B2* | 10/2006 | Coles et al. | 379/202.01 |
| 7,133,513 | B1* | 11/2006 | Zhang | 379/202.01 |
| 7,302,390 | B2 | 11/2007 | Yang | |
| 7,343,008 | B1* | 3/2008 | Frankel | 379/202.01 |
| 7,539,086 | B2 | 5/2009 | Jaroker | |
| 7,539,290 | B2 | 5/2009 | Ortel | |
| 7,545,758 | B2 | 6/2009 | Caspi | |
| 7,844,454 | B2 | 11/2010 | Coles | |
| 8,150,689 | B2 | 4/2012 | Beach | |
| 2002/0193991 | A1* | 12/2002 | Bennett et al. | 704/247 |
| 2003/0122921 | A1 | 7/2003 | Taib | |
| 2004/0021765 | A1* | 2/2004 | Kubala et al. | 348/14.08 |
| 2004/0114541 | A1 | 6/2004 | Caspi | |
| 2004/0186712 | A1 | 9/2004 | Coles | |
| 2005/0207554 | A1 | 9/2005 | Ortel | |
| 2007/0106724 | A1* | 5/2007 | Gorti et al. | 709/204 |
| 2007/0206759 | A1 | 9/2007 | Boyanovsky | |
| 2009/0135741 | A1 | 5/2009 | Mykhalchuk | |
| 2009/0177470 | A1 | 7/2009 | Beach | |
| 2009/0292539 | A1 | 11/2009 | Jaroker | |

OTHER PUBLICATIONS

Mishne et al. "Automatic Analysis of Call-Center Conversations", In Proceedings of the 14th ACM international conference on Information and knowledge management (2005), pp. 453-459.*
Hindus et al. "Capturing, Structuring and Representing Ubiquitous Audio", ACM Transactions on Information Systems, vol. 11, 1993, pp. 376-400.*
Diakopoulos et al. "Audio Puzzler: Piecing Together Time-Stamped Speech Transcripts with a Puzzle Game", ACM Multimedia, 2008.*
Mishne et al. "Automatic Analysis of Call-Center Conversations", In Proceedings of the 14th ACM international conference on Information and knowledge management (2005), pp. 453-459 (7 pages).

(Continued)

*Primary Examiner* — Samuel G Neway
(74) *Attorney, Agent, or Firm* — Ballard Spahr LLP (57) ABSTRACT

Described herein are embodiments of systems, methods and computer program products for real-time transcription of conference calls that employ voice activity detection, audio snippet capture, and multiple transcription instances to deliver practical real-time or near real-time conference call transcription.

21 Claims, 5 Drawing Sheets

OTHER PUBLICATIONS

Hindus et al. "Capturing, Structuring and Representing Ubiquitous Audio", ACM Transactions on Information Systems, vol. 11, 1993, pp. 376-400 (25 pages).

Diakopoulos et al. "Audio Puzzler: Piecing Together Time-Stamped Speech Transcripts with a Puzzle Game", ACM Multimedia, 2008 (4 pages).

Amir et al. Towards Automatic Real Time Preparation of On-Line Video. Proceedings of the 34th Hawaii International Conference on System Sciences. 2001. (8 pages).

Wellner et al. Conference Scribe: Turning Conference Calls into Documents. Proceedings of the 34th Hawaii International Conference on System Sciences. 2001. (9 pages).

* cited by examiner

REAL-TIME TRANSCRIPTION OF CONFERENCE CALLS

CROSS-REFERENCE TO RELATED APPLICATION

This patent application claims the benefit of U.S. Provisional Patent Application No. 61/256,558, filed Oct. 30, 2009, and entitled "Real-Time Transcription of Conference Calls", which is hereby incorporated by reference in its entirety.

BACKGROUND

Business professionals are routinely using audio conferencing systems, rather than in-person meetings, to collaborate. Conference calls are now a mainstay of business life, and continue to grow in popularity. The functionality of conference calling is not only used on a "stand-alone" basis, but also as part of video calls and "web conferences." Often times, conference calls are recorded and then transcribed, so that those that could not attend can review the conversation, or so that those that did attend have a written record of what was said. The transcription, usually performed by a human transcriptionist, is typically available hours or days after the conference call takes place.

There are a number of applications for real-time teleconference transcription, which converts the conference call conversation to text while the teleconference is occurring and makes it accessible via a display and computer network (such as a web browser over the Internet).

Using real-time teleconference transcription enables those with hearing impairments to participate. Latecomers could review what they had missed. An individual could readily monitor multiple conference calls by watching, rather than listening. Participants that needed to step away or were interrupted could easily catch up when they returned. Participants could refer back to earlier dialogue if they couldn't recollect what had been said. Internet "chat" (entered via keyboard) could easily be mixed with spoken conversation.

Unfortunately, conference call transcription has been hampered by high cost, since historically it has been very labor-intensive. Automated speech-to-text (also called automatic speech recognition, ASR) technology has been improving, and it shows increasing promise. However, there are challenges to using ASR for real-time conference call transcription. The technology generally does not perform well in the performance of double-talk (more than one party speaking at once) or with background noise. ASR generally lacks the ability to identify who is talking (it cannot recognize voices). Many ASR algorithms cannot run in real time (it can take the algorithm more than one minute to convert a minute of speech). And, it can be costly to run ASR (both in terms of the computer resources required and potential royalties that must be paid).

Therefore, what is needed is a solution that addresses the challenges of conference call transcription, some of which are described above.

SUMMARY

Described herein are embodiments of systems, methods and computer program products for real-time transcription of conference calls that employ voice activity detection, audio snippet capture, and multiple transcription instances to deliver practical real-time or near real-time conference call transcription. In one aspect, participants in a conference call are each separately monitored. When any of them are speaking, their voice (isolated from the voices of other participants) is captured, one phrase or sentence at a time (called a "snippet"), and is sent to an instance of the transcription algorithm for conversion to text. A snippet can be determined by a voice activity detector (VAD), which can use any of several techniques as described herein or as known to one of ordinary skill in the art to determine when the participant is speaking and to find breaks in the speech. The resulting text output is labeled with the speaker's identity and concatenated with text derived from speech of the other participants.

In one aspect, multiple instances of the transcription (ASR) engine allow the system to transcribe speech from multiple talkers at once. Even when only one person is talking, the system can dispatch their speech in snippets to separate ASR instances. So, even if the embodiment of an ASR algorithm being used is not capable of transcribing a stream of speech in real-time, an embodiment of the system of the present invention can produce a near-real-time results by parsing the speech into snippets that are sent to a plurality of ASRs.

In one aspect, an ASR instance is not dedicated to each channel, therefore, ASR resources are not wasted on participants that are not speaking. Embodiments of the transcription system are exceptionally scalable even to conferences including hundreds or thousands of participants, because at any given instant, only one or a few will be talking.

Additional advantages will be set forth in part in the description which follows or may be learned by practice. The advantages will be realized and attained by means of the elements and combinations particularly pointed out in the appended inventive concepts. It is to be understood that both the foregoing general description and the following detailed description are exemplary and explanatory only and are not restrictive, as inventive concepts.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended inventive concepts, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and inventive concepts of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
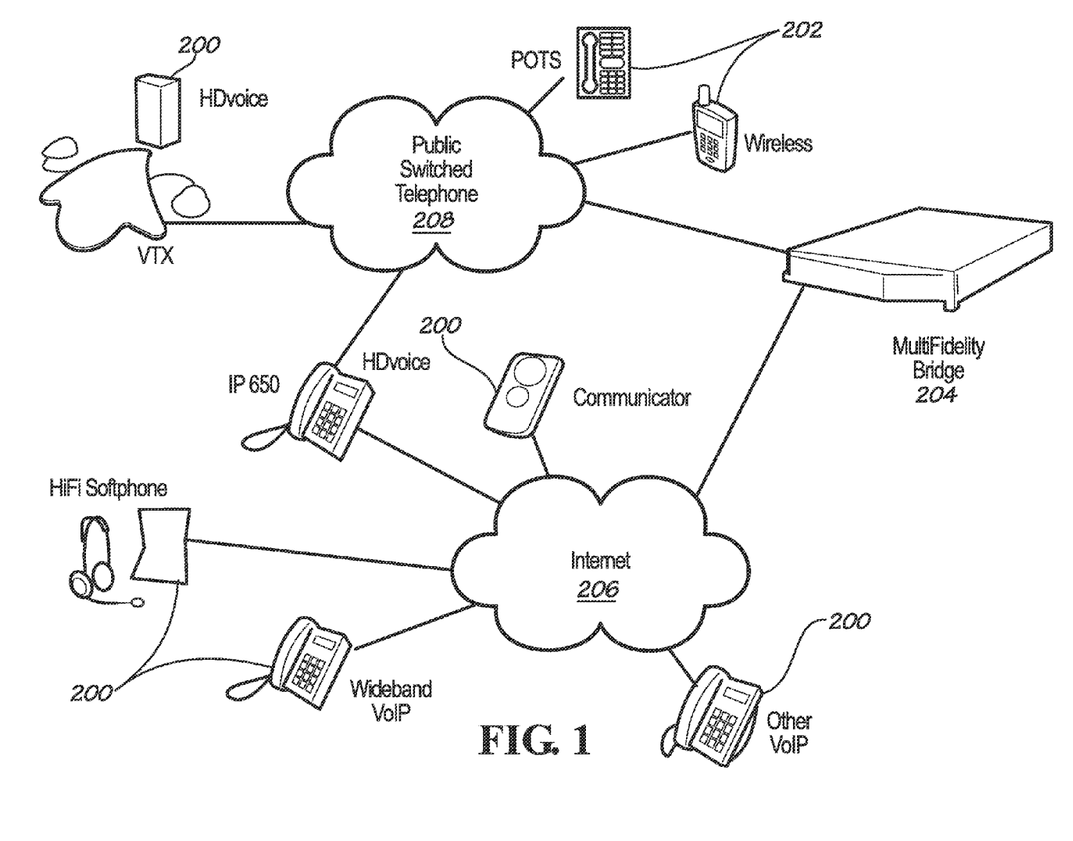
FIG. 1 illustrates an exemplary environment for practicing embodiments of the invention.

Overview:

FIG. 1 illustrates an exemplary environment for practicing embodiments of the invention. As shown in FIG. 1, endpoint devices 200, 202 interface with a conferencing bridge 204 via wideband capable networks 206 and narrowband networks 208. As shown in FIG. 1, endpoint devices 200, 202 are in numerous form and versions, including wired and wireless as well as Internet-based devices such as a "softphone" and/or Internet messaging clients such as computers configured to use VoIP via tools like GoogleTalk™ and Skype™.

In a conventional conference call, two or more audio connections are linked to a conference bridge, such as the multifidelity bridge 204 shown in FIG. 1. Incoming audio from each of the audio connections is mixed (using algorithms of varying complexity) and sent back to the participants via the outgoing side of each connection.

The audio connections can be, for example, conventional telephone connections (established by participants dialing a phone number to connect to the bridge, or by the bridge dialing the phone numbers of the participants, or some combination). The audio connections can also be, for example, Voice-over-IP or some similar network connection. Some systems, such as the embodiment shown in FIG. 1, can support a mix of telephony and VoIP participants in any given conference call. Typically, by the time the audio connection reaches the conference bridge 204, it has been converted to a digital format consisting of encoded audio samples and carried either in packet form or via time-division-multiplexing.

Figure 2:
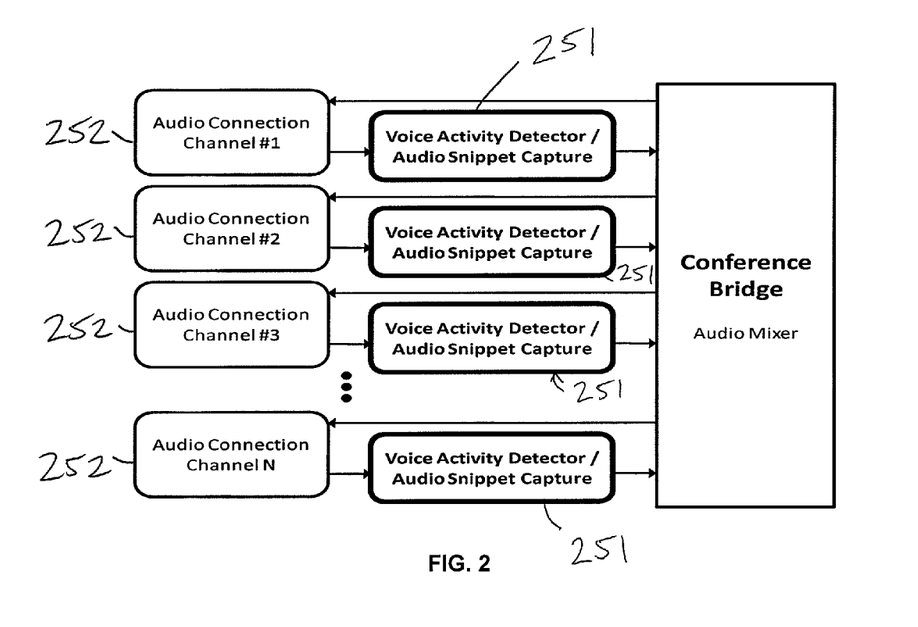
FIG. 2 is a block diagram illustrating voice activity detector (VAD) and audio snippet capture functions according to an embodiment of the invention.
Figure 3:
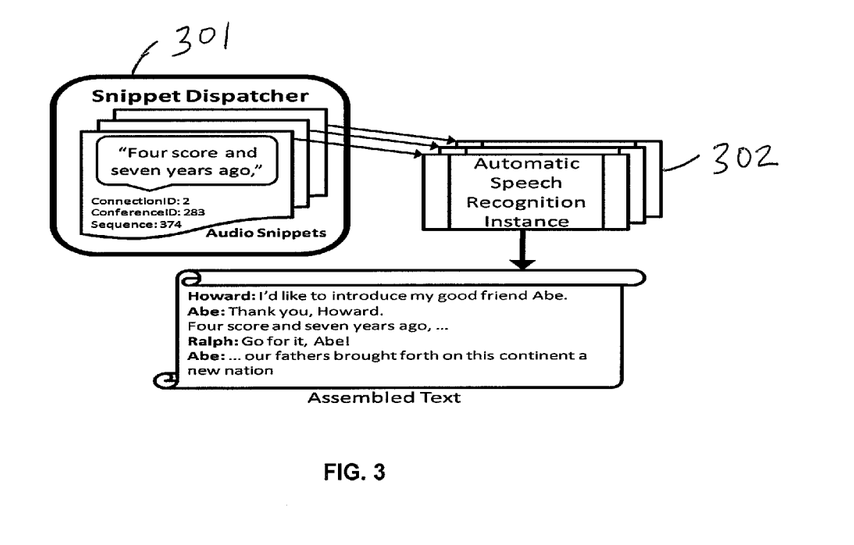
FIG. 3 is a block diagram illustrating functions of a snippet dispatcher, which manages the assignment of audio snippets received from the VAD and audio snippet capture functions to one or more transcription instances (ASRs), according to an embodiment of the invention.

Embodiments described herein provide a practical way to perform real-time or near real-time transcription of a conference call and, as shown in FIG. 2, comprise voice activity detector (VAD) and audio snippet capture functions 251, which monitor each audio connection 252 in a conference and capture individual phrases or paragraphs as they are spoken. Improvements in ASR and VAD technology can be incorporated as they become available, making the embodiments of the described system even more capable and cost-effective. Also, embodiments described herein comprise a snippet dispatcher 301, as shown in FIG. 3, which manages the assignment of audio snippets received from the VAD and audio snippet capture functions 251 to one or more ASRs 302.

In one aspect, an embodiment of the invention provides a means to perform near real-time transcription, even when the ASR algorithm cannot operate in real-time. For example, if the embodiment of an ASR algorithm being used is not capable of transcribing a stream of speech in real-time, an embodiment of the system of the present invention can produce a near-real-time results by parsing the speech into snippets that are sent to a plurality of ASRs. In one aspect, an embodiment of the invention provides a means to identify each audio connection (and potentially each individual speaker) in a conference, without dedicating an ASR instance to each connection. When the embodiment of an ASR algorithm being used operates faster than real-time, a single (or a few) ASR instances can be shared among many speakers and several conferences. If an ASR algorithm is licensed "by the minute" (or there is otherwise an expense associated with having the ASR algorithm available to transcribe an audio stream), an embodiment of the invention, through its sharing of ASR instances, is much more cost-effective than one that dedicates an ASR instance to each connection.

As shown in FIG. 2, in one embodiment a VAD/audio snippet capture mechanism can be inserted in the path from each audio connection to the conference bridge. The VAD determines when a given participant is, and is not, speaking. In one aspect, the VAD can be very simple, detecting, for example, just that the audio signal exceeds a certain energy threshold. Or, in other aspects, the VAD can be more complex, distinguishing actual speech from other noises such as blowing wind, or coughing or breathing or typing. In various configurations, the VAD can also include, or work cooperatively with, a noise filter that removes the impairments before the audio signal is passed on. The sophistication of the VAD can have an impact on the quality of the transcription; however, embodiments of the invention are operable with a wide range of VAD algorithms, from simple to extremely complex.

Embodiments of the audio snippet capture mechanism work in conjunction with the VAD to capture the digital audio samples during those intervals when the corresponding participant is determined to be speaking. In one aspect, the audio snippet capture mechanism monitors the VAD to decide when it has collected a suitable snippet. Preferably, though not required, speech is captured by the audio snippet capture mechanism up to a natural break, such as the end of a sentence or paragraph. The snippet length can vary. Generally, snippet length varies according to implementation details, such as the optimum message size for transmission over the connection mechanism to the ASR, and the maximum delay desired between when the words are spoken and when they appear in the transcription. Thus, in one aspect the audio snippet capture mechanism monitors the length of time that the VAD indicates the participant has not been speaking, as well as the running length of the snippet, to determine the appropriate stop point.

In one embodiment, the nominal "not speaking" interval can be set to, for example, 400 milliseconds, looking for a natural "sentence" break, though other intervals are contemplated within the scope of embodiments of the invention. However, if no such break is found after, for example, 10 seconds, the "not speaking" interval threshold can be dynamically lowered to, for example, 200 milliseconds. If no such break is found after, for example, 20 seconds elapsed, the "not speaking" interval threshold can be dynamically lowered to, for example, 50 milliseconds. In one aspect, a snippet can be considered "complete" at a maximum of, for example, 30 seconds (and immediately commence capture of a subsequent snippet) if no "not speaking" interval has been detected at all. The values above are exemplary and are not intended to be limiting as the "not speaking" interval and the maximum snippet length can be adjusted for user preference and particular applications.

As shown in FIG. 3, as snippets are captured by the audio snippet capture mechanism, they are sent to the snippet dispatcher. In one aspect, the snippet dispatcher function can be a separate process through which all snippets are funneled, or it can be a distributed function that is executed as each capture process completes. As shown in FIG. 3, the snippet dispatcher is responsible for passing the captured snippet to the ASR instance, and it can operate in any of several modes depending on the overall system configuration and constraints of the ASR instances.

In some embodiments, the snippet dispatcher queues the snippets as they arrive from the one or more audio snippet capture mechanisms. The snippet dispatcher monitors the "busyness" of the ASR instances and the snippets are dispatched to ASR instances as the instances become available. The snippet dispatcher instructs the ASR instance to notify it upon completion of snippet processing so that the next snippet can be taken off the queue and dispatched.

In another embodiment, the number of ASR instances is not constrained. In this case, upon arrival of a new snippet at the snippet dispatcher, the snippet dispatcher instantiates a new ASR instance to process that snippet. Once processing of the snippet is complete, the ASR instance may disappear.

The audio snippet capture mechanism tags each snippet with the identity of the audio connection to which it corresponds, as well as a label indicating of which conference it is a part. It is also given a sequence number, so that its place in time can be determined relative to other snippets being generated from this and other audio connections. As the ASR instances finish their conversion of the snippets to text, they dispatch the results, including the parameters received with the snippet, to an aggregator that labels each with the appropriate audio connection identifier and combines them according to conference ID and sequence number. The results are then sent to (or available for retrieval by) parties subscribed to each particular conference transcript. Embodiments of the invention can be used in a wide variety of environments and numerous enhancements are possible and considered within the scope of the embodiments.

The VAD and audio snippet capture, and the snippet dispatcher mechanisms can be separate from the conference bridge, or can be integrated with it. Typically, these elements are implemented as software algorithms running on general-purpose computers, but they can be implemented as software running on digital signal processing hardware (DSP), or embodied in purpose-built hardware. The various elements of embodiments of the invention, and the conferencing system in its entirety, can be implemented in a single computer platform. Or the elements can be partitioned into separate subsystems, communicating over a local or wide-area network.

The identifier for each audio connection can be, for example, a numeric label; it could also be a "Caller-ID" captured as part of an incoming call or other signaling information sent when the call is established. Or, it could be communicated explicitly by a control function associated with the conferencing system. Or, it could be extracted from DTMF signals input by the participant when joining the call. Analogous techniques can also be used for the conference ID.

In some instances, the name of a teleconference participant may be known to the conferencing system, and this can be associated with the text output for that participant by linking the name to the audio connection ID. See, for example, U.S. Pat. No. 7,343,008, issued on Mar. 11, 2008, and incorporated herein by reference for an example of a teleconferencing system that can assign a name to a participant. In some situations, there may be multiple individuals associated with a given audio connection—for example, when several people are in a single conference room sharing a speakerphone. Their words can be tagged with a suitable label ("Boston Conference Room"), or a more explicit technique can be used to identify them. For example, each individual could be assigned a DTMF digit that they would press prior to speaking, which would be captured by a DTMF detector associated with the VAD and appended to the audio connection ID. Or, the ASR could be taught to recognize a particular phrase ("Now speaking: Ralph") that participants would use to introduce themselves, and the transcribed name could then be made part of the audio connection ID passed to the aggregator function.

Some ASR algorithms can "learn," resulting in enhanced performance as they process more speech from a specific individual. If the ASR instances have access to a shared database, they can use the audio connection ID to store "learned" information about that speaker in the database, which can then be retrieved by another (or the same) ASR instance when it resumes processing speech for that same audio connection. To the extent that two or more ASR instances are simultaneously processing audio for the same audio connection, it may not be possible to capture the "learnings" for all of them. Some ASR algorithms also "learn" from the context of the speech. Here, it may enhance performance if the shared database is used to exchange this type of learning across all participants in a given conference call, since they will likely be re-using many of the same words and phrases.

ASR algorithms are available for different languages. In multi-lingual environments, the language for a given conference call or an individual audio connection can be specified, and an appropriate ASR instance can be invoked, or language-specific ASR settings applied, when the associated snippets are dispatched.

It can be seen that embodiments of the invention can operate when there is only one party in the conference call. Embodiments of the invention can also function when there are an unlimited number of parties to the call, and can handle any number of simultaneous conference calls, provided that appropriate resources are available. "Cloud" computing can be employed, for example, to instantiate additional instances of the ASR function when required. Embodiments of the invention can operate on a "stand-alone" audio conference call, or on the audio portion of a video conference call, or the audio conference conducted as part of a web conference.

Figure 6:
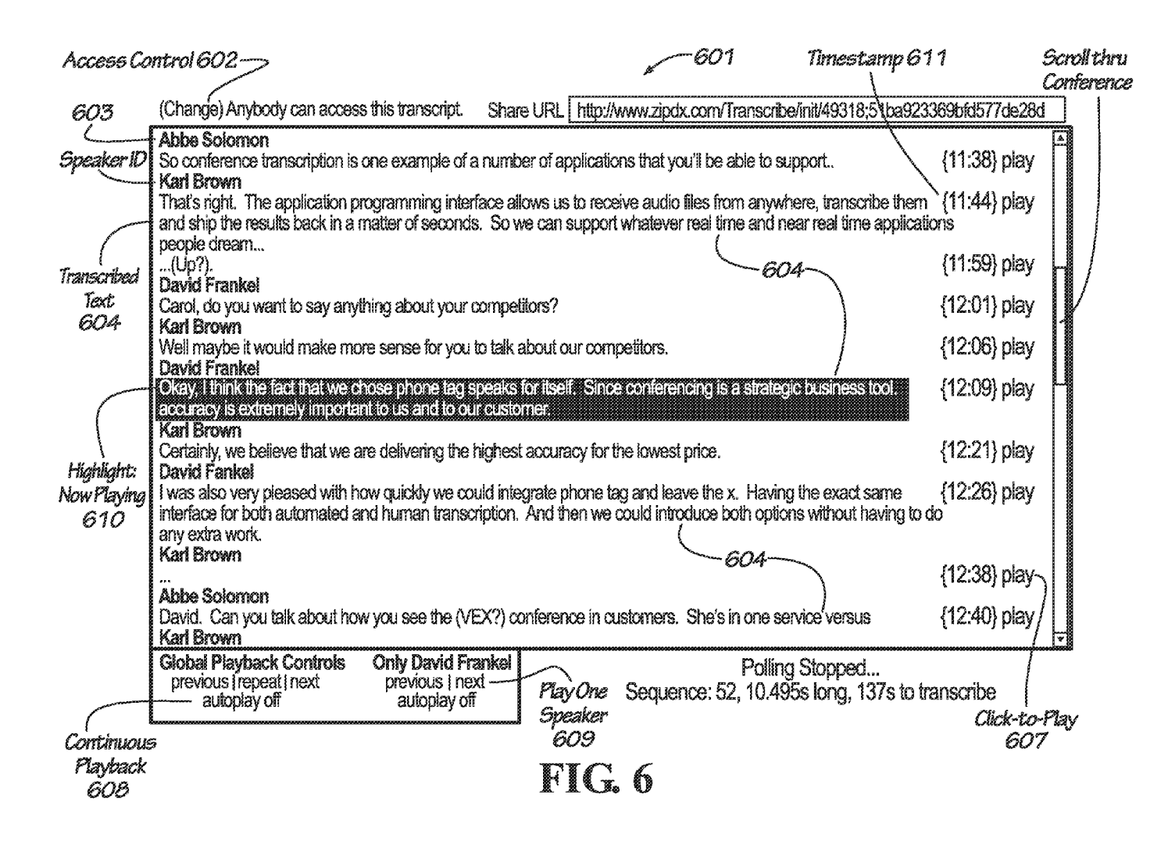
FIG. 6 is a sample screen shot depicting the operation of the present invention, in one embodiment.

In one embodiment, the "aggregator" mentioned above receives transcription text (called text items) from the ASR instances and can operate in a variety of different ways. One approach is to store the text items in a database, along with the associated sequence numbers and speaker identification and any other available information. As depicted in FIG. 6, a software application (called a transcription viewer 601) may run on a computer with a display device (such as a personal computer, or a smart phone); it retrieves and displays the text items and associated data from the database. The application could be implemented to run in an internet browser, or in some similar environment, or it could be a specialized application for a specific platform. The transcription viewer can also be configured such that it can be embedded into some other application (such as a blog or a web page providing other functions).

Depending on the particular situation, access to the transcription viewer 601 for a particular conference call might be restricted to only the organizer of that call, or only to participants in that call (602). It might also be made more generally available, to anybody at all or only to those with a password. Those skilled in the art are familiar with various kinds of access control mechanisms that could be applicable.

The transcription viewer 601 can display the results of the transcription (603) in near-real-time (that is, as the conference takes place with a short delay). It can repeatedly poll the database for new updates and display these in the proper order by referencing the sequence numbers. The transcription viewer 601 can also operate after the conference has ended.

The transcription viewer 601 can display all the text items 604, or it can allow the user to select a subset for display based on some criteria (such as speaker identification, or a sequence numbers, or timestamps 611 if that information is available). It can allow the text to be searched, highlighting, for example, all text items containing a particular word or phrase.

The transcription viewer 601 can further allow the user to hear the original audio associated with a given text item. This can be implemented by, for example, associating in the database for each text item an audio file containing the source snippet. When the user selects (via mouse click, for example) a particular text item (607), the transcription viewer 601 plays the associated snippet through the computer's speaker or headphone.

The transcription viewer 601 can offer the ability to play back all the text items sequentially (608), providing an on-screen highlight of the text item currently being played (610). It can offer the ability to play back only certain text items (such as those belonging to a particular speaker) (609). Since audio is captured from each channel separately, the transcription viewer 601 can be configured so that if two or more participants were speaking concurrently, their snippets are played sequentially. Or, if timestamps are available for each snippet, the transcription viewer 601 can replay the snippets as they actually took place, allowing speakers to overlap by merging the audio from multiple snippets.

The transcription viewer 601 can allow a user to modify the text and then store it back into the database for subsequent viewing by others. This can be useful for correcting errors in the original transcription.

The use of Automated Speech Recognition technology has been described to perform the speech-to-text function. However, this same invention can be used in conjunction with human transcriptionists. Rather than queuing the snippets for processing by one or more ASR instances, the snippets can be queued and dispatched to one or more transcriptionists, each of which listens to a snippet played through a computer and enters via keyboard the corresponding text.

Analogous to the description above, this approach allows many transcriptionists to work simultaneously on the same conference call. In contrast to a more traditional approach where a single person transcribes an entire conference, in this mode a finished transcript can be available shortly after the call ends. And rather than having the transcriptionist try to identify speakers by recognizing voices, the speakers can be identified according to the channel from which any given snippet was captured.

Figure 4:
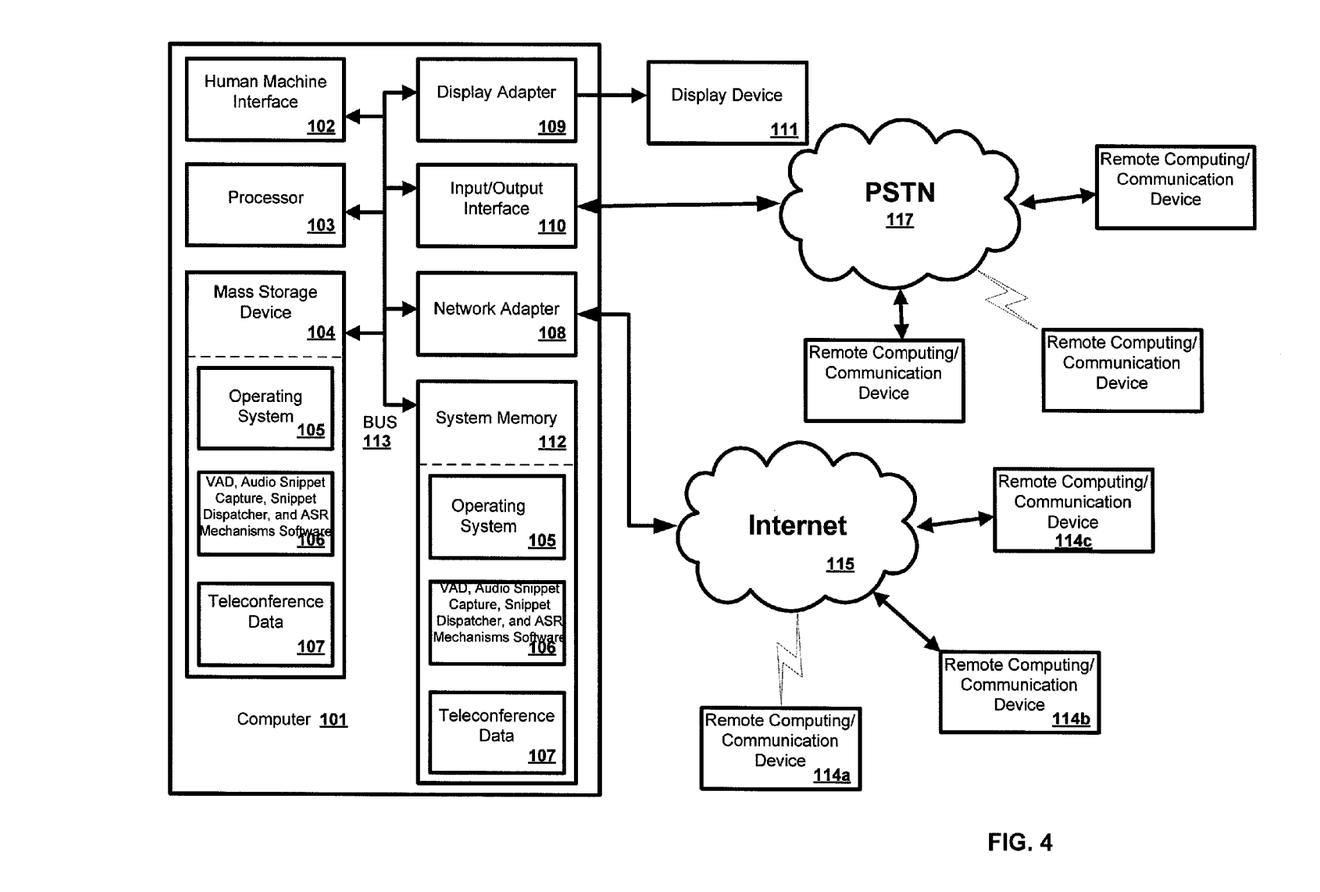
FIG. 4 is a block diagram illustrating an exemplary operating environment for performing the disclosed methods.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise the VAD, Audio Snippet Capture, Snippet Dispatcher, and ASR mechanisms software 106 as illustrated in FIG. 4 and described below. In one exemplary aspect, the units can comprise a computer 101 as illustrated in FIG. 4 and described below.

FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise teleconference bridges, set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, VAD, Audio Snippet Capture, Snippet Dispatcher, and ASR mechanisms software 106, teleconference data 107 (which can include "learned" data available to the ASR algorithms), a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as teleconference data 107 and/or program modules such as operating system 105 and VAD, Audio Snippet Capture, Snippet Dispatcher, and ASR mechanisms software 106 that are immediately accessible to and/or are presently operated on by the processing unit 103.

In another aspect, the computer 101 can also comprise other removable/non-removable, volatile/non-volatile computer storage media. By way of example, FIG. 4 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and VAD, Audio Snippet Capture, Snippet Dispatcher, and ASR mechanisms software 106. Each of the operating system 105 and VAD, Audio Snippet Capture, Snippet Dispatcher, and ASR mechanisms software 106 (or some combination thereof) can comprise elements of the programming and the VAD, Audio Snippet Capture, Snippet Dispatcher, and ASR mechanisms software 106. Teleconference data 107 can also be stored on the mass storage device 104. Teleconference data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like. Furthermore, in one embodiment, the computer 101 can be operably connected with a public switched telephone network (PSTN) 117, as shown in FIGS. 1 and 4, providing connection to endpoint devices 200, 202.

The computer 101 can operate in a networked environment using logical connections to one or more remote computing/communication devices 114a,b,c and endpoint devices 200, 202. By way of example, a remote computing/communication device can be a personal computer, portable computer, a server, a router, a network computer, a peer device or other common network node, another teleconference bridge, endpoint devices 200, 202 as shown in FIG. 1, and so on. Logical connections between the computer 101 and a remote computing device/communication 114a,b,c can be made via a local area network (LAN) and a general wide area network (WAN), or specialized networks such as a PSTN 117. Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of VAD, Audio Snippet Capture, Snippet Dispatcher, and ASR mechanisms software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Exemplary Method of Use:

The following example is put forth so as to provide those of ordinary skill in the art with a complete disclosure and description of how the compounds, compositions, articles, devices and/or methods described herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for.

Figure 5:
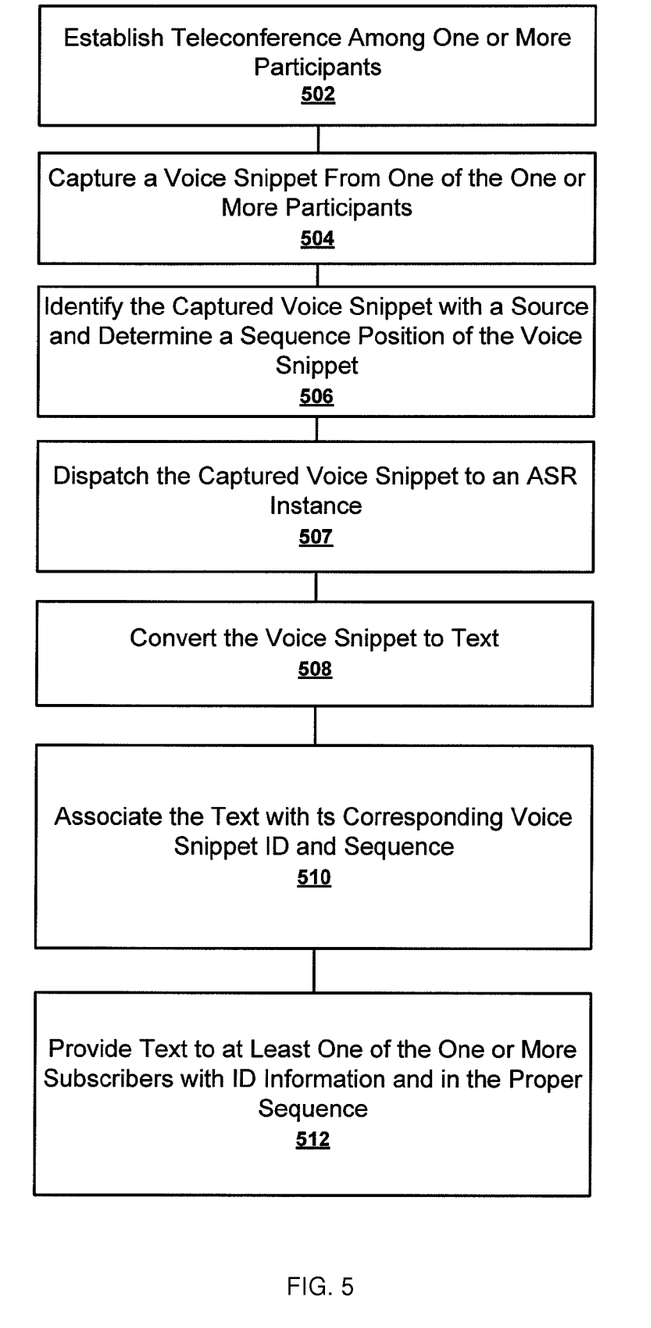
FIG. 5 is an exemplary flowchart illustrating a process for practicing an aspect according to an embodiment of the present invention.

Referring to the exemplary flowchart of FIG. 5, a process is illustrated for practicing an aspect according to an embodiment of the present invention. At step 502 a conference call is established among one or more participants. Note that the call may be only one person as that person may want to use embodiments of the invention for transcription purposes. At step 504, a voice snippet is captured from one of the one or more participants. As described above, this is accomplished via the Voice Activity Detector/Audio Snippet Capture mechanism, as shown in FIG. 2. At step 506, the captured voice snippet is assigned an identifier and a sequence position. As noted herein, the audio snippet capture mechanism assigns the identifier and sequence position to the voice snippet. At step 507, the voice snippet is provided to an ASR instance. A snippet dispatcher mechanism can queue the snippet, if necessary, and dispatch it to an instance of an ASR mechanism. At step 508, the voice snippet is converted into a text string. As noted above, this may be performed by one or more ASR instances. At step 510, the text string is associated with its corresponding snippet ID and sequence position. At step 512, the text string is provided to at least one of the one or more subscribers to the transcription.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method inventive concept does not actually recite an order to be followed by its steps or it is not otherwise specifically stated in the inventive concepts or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following inventive concepts.

What is claimed:

1. A system for transcribing a conference call among a plurality of participants using a plurality of audio connections; the system comprising:
   (a) a plurality of capture mechanisms, each one of the plurality of capture mechanisms capturing a portion of audio associated with one of the plurality of audio connections,
      wherein each one of the plurality of capture mechanisms comprises
         a voice activity detector for detecting a voice snippet included in the portion of audio, the length of the voice snippet being determined by detecting a break in the portion of audio, and
         means for capturing the voice snippet;
   (b) a plurality of speech recognition instances for converting audio to text, each one of the plurality of speech recognition instances having substantially the same capability;
   (c) a dispatcher for forwarding a first captured portion of audio from a selected one of the plurality of capture mechanisms to a first one of the plurality of speech recognition instances, and for forwarding a second captured portion of audio from the selected one of the plurality of capture mechanisms to a second one of the plurality of speech recognition instances when the first one of the plurality of speech recognition instances is processing the first captured portion of audio, wherein the second captured portion of audio is subsequent to the first captured portion of audio; and
   (d) a combiner for re-assembling the text converted by the first one of the plurality of speech recognition instances and the text converted by the second one of the plurality of speech recognition instances from captured portions of audio from the plurality of capture mechanisms.

2. The system of claim 1, wherein the voice activity detector automatically adapts to maintain a target snippet length.

3. The system of claim 1, wherein each of the plurality of capture mechanisms generates an audio connection ID and sequence number associated with the captured portion of audio, and wherein the combiner re-assembles the text based on the audio connection IDs and sequence numbers generated by each of the plurality of capture mechanisms.

4. The system of claim 3, wherein the sequence number associated with each captured portion of audio comprises a sequence in time relative to other captured portions of audio.

5. The system of claim 1, wherein each of the plurality of speech recognition instances performs an automated speech to text algorithm.

6. The system of claim 1, wherein each of the plurality of speech recognition instances is a human transcriptionist.

7. The system of claim 1, wherein the combiner function is accomplished by storing the converted text and any associated meta-data to a database, and further comprising an output mechanism which retrieves and displays the converted text and meta-data.

8. The system of claim 7, wherein the output mechanism displays the re-assembled text in near real-time.

9. The system of claim 7, wherein the output mechanism allows a user to hear one or more audio snippets associated with selected re-assembled text.

10. The system of claim 7, wherein the output mechanism provides access to the re-assembled text after the conference call has ended.

11. A method for transcribing a conference call among a plurality of participants using a plurality of audio connections; the method comprising:
   (a) capturing a plurality of portions of audio, each of the plurality of portions of audio being associated with at least one of the plurality of audio connections;
   (b) forwarding a first portion of audio of the captured plurality of portions of audio to a first one of a plurality of speech recognition instances, and for forwarding a second portion of audio of the captured plurality of portions of audio to a second one of the plurality of speech recognition instances, the first portion of audio and the second portion of audio being associated with a selected one of the plurality of audio connections, whereby each of the plurality of speech recognition instances converts the audio to text, wherein the second portion of audio is subsequent to the first portion of audio, and wherein each one of the plurality of speech recognition instances has substantially the same capability;
   (c) re-assembling the text converted by the first one of the plurality of speech recognition instances and the text converted by the second one of the plurality of speech recognition instances.

12. The method of claim 11, wherein the capturing step comprises detecting a voice snippet, wherein the length of the voice snippet is determined by detecting a break in audio of the associated audio connection.

13. The method of claim 12, wherein the capturing step automatically adapts to maintain a target snippet length.

14. The method of claim 11, wherein the capturing step comprises:
   generating an audio connection ID and sequence number associated with each of the plurality of portions of audio, and
   re-assembling the text based on the audio connection IDs and sequence numbers generated by the capturing step.

15. The method of claim 14, wherein the sequence number associated with each captured portion of audio comprises a sequence in time relative to other captured portions of audio.

16. The method of claim 11, wherein the re-assembling step is accomplished by storing the converted text and any associated meta-data to a database, and further comprising the steps of retrieving and displaying the converted text and meta-data.

17. The method of claim 11, further comprising displaying the re-assembled text in near real-time.

18. The method of claim 11, further comprising allowing a user to hear one or more audio snippets associated with selected re-assembled text.

19. The method of claim 11, further comprising providing access to the re-assembled text after the conference call has ended.

20. A non-transitory computer-readable medium having a computer program recorded thereon, the computer program comprising computer code instructions for implementing a method for transcribing a conference call among a plurality of participants using a plurality of audio connections; the non-transitory computer-readable medium comprising:
   (a) a first computer code instruction portion for capturing a plurality of portions of audio, each of the plurality of portions of audio being associated with at least one of the plurality of audio connections;
   (b) a second computer code instruction portion for forwarding a first portion of audio of the captured plurality of portions of audio to a first one of a plurality of speech recognition instances, and for forwarding a second portion of audio of the captured plurality of portions of audio to a second one of the plurality of speech recognition instances, the first portion of audio and the second portion of audio being associated with a selected one of the plurality of audio connections, whereby each of the plurality of speech recognition instances converts the audio to text, wherein the second portion of audio is subsequent to the first portion of audio, and wherein each one of the plurality of speech recognition instances has substantially the same capability; and (c) a third computer code instruction portion for re-assembling the text converted by the first one of the plurality of speech recognition instances and the text converted by the second one of the plurality of speech recognition instances.

21. The system of claim 1, wherein the dispatcher allocates a third speech recognition instance to the plurality of speech recognition instances for converting a third captured portion of audio to text, wherein the third captured portion of text is subsequent to the second portion of audio.

* * * * *